April 7, 1959  J. N. CARMAN, JR  2,881,369
GLASS SEALED CRYSTAL RECTIFIER

Filed March 21, 1955  5 Sheets-Sheet 1

INVENTOR.
JUSTICE N. CARMAN, JR.
BY
Seymour M. Rosenberg
ATTORNEY

April 7, 1959   J. N. CARMAN, JR   2,881,369
GLASS SEALED CRYSTAL RECTIFIER
Filed March 21, 1955   5 Sheets-Sheet 2

INVENTOR,
JUSTICE N. CARMAN, JR.
BY
Seymour M. Rosenberg
ATTORNEY

April 7, 1959   J. N. CARMAN, JR   2,881,369
GLASS SEALED CRYSTAL RECTIFIER
Filed March 21, 1955   5 Sheets-Sheet 4

INVENTOR,
JUSTICE N. CARMAN, JR.
BY
Seymour M. Rosenberg
ATTORNEY

April 7, 1959   J. N. CARMAN, JR   2,881,369
GLASS SEALED CRYSTAL RECTIFIER
Filed March 21, 1955   5 Sheets-Sheet 5

INVENTOR,
JUSTICE N. CARMAN, JR.
BY
Seymour M. Rosenberg
ATTORNEY

2,881,369
Patented Apr. 7, 1959

2,881,369
GLASS SEALED CRYSTAL RECTIFIER

Justice N. Carman, Jr., Woodland Hills, Calif., assignor to Pacific Semiconductors, Inc., Culver City, Calif.

Application March 21, 1955, Serial No. 497,353

25 Claims. (Cl. 317—234)

This invention relates to a glass-sealed crystal rectifier, and more particularly to a hermetically sealed semiconductor diode wherein the crystal element is mounted within a miniaturized cylindrical housing, the central region of which is composed of a glass tube, and to methods of making the diode.

It has long been recognized in the semiconductor art that the ideal housing or envelope for encapsulating semiconductor devices must possess a number of important characteristics. Firstly, the housing should be hermetically sealed to protect the crystal element mounted therein from the adverse affects of moisture. This particular requirement is especially critical when the crystal element is composed of an intrinsic semiconductor, such as germanium or silicon, which is particularly sensitive to even slight increases in humidity.

A second characteristic essential to the ideal semiconductor package is that its overall dimensions must be relatively small while nevertheless permitting relatively large power dissipation by the device. An ideally encased crystal rectifier, for example, should be capable of dissipating of the order of one or more watts of heat energy, whereas the majority of the crystal rectifiers now known to the art have rated power dissipations of the order of one tenth of a watt.

Still another essential characteristic of the ideal semiconductor housing is that it should remain unaffected by temperatures substantially higher than the highest temperature at which its rectifying element is capable of operating. For example, in those devices employing crystal elements of germanium, which is operative at temperatures as high as 80° C., the enclosing envelope should be capable of withstanding temperatures of the order of 200° C., while devices employing silicon should be capable of withstanding temperatures of the order of 300° C.

Another feature of the ideal semiconductor housing which is of the utmost significance is that it be of simple design and mechanically rugged. More specifically, it should be able to withstand severe shocks without breakage or mutilation, and be capable of being incorporated into electrical circuits with a minimum of effort and time. More particularly, the housing should be adapted to cooperate with plug-in connectors, or with the conventional wire receiving terminals known to the art. In addition, the mechanical properties of the housing should be such as to prevent variations of the electrical characteristics of the completed device due to dimensional variations caused by changes in the temperature of the housing components and variations in the ambient humidity.

Still other features which the ideal diode envelope or housing should possess are that the interelectrode capacitance should be small and the polarity of the device should be easily ascertainable. Moreover, the elements of the envelope should be relatively inexpensive and easily fabricated and combined to provide an inexpensive yet reliable unitary structure.

In the prior art many different forms of packages have been evolved for encapsulating semiconductor diodes. The packages have been composed of metal, plastic, ceramic, glass, and various combinations of these elements. Undoubtedly the most satisfactory of these prior art diodes, from the overall standpoint of the aforementioned ideal characteristics, have been those which employ some form of glass housing for enclosing the semiconductor element.

The glass-sealed diodes of the prior art fall into two categories; those which employ glass-to-metal seals between the glass housing and the associated electrodes, and those wherein the electrodes are affixed to associated Kovar type sleeves which in turn are sealed to the glass envelope. In general, the former type of glass housings provide a good hermetic seal to protect the enclosed semiconductor elements, whereas the latter type are not truly hermetically sealed owing to the fact that the connections between the electrodes and their associated sleeves are made with solder. More particularly, solder does not fuse with metallic members which it joins, but merely wets their surfaces. Consequently, solder joints are notoriously undependable when employed to provide a gas tight seal. In some instances glass enclosed semiconductor diodes of the category utilizing Kovar sleeves have even been sealed with an insulating material, as illustrated in U. S. Patent 2,572,993, for example.

One of the most significant disadvantages of the prior art diodes which employ a glass envelope sealed directly to its associated electrodes is that its power handling capacity is inherently limited. More particularly, it is practically impossible to utilize electrodes which provide an adequate heat sink for conducting away heat generated within the semiconductor element, the principal reason being that electrodes composed of even a poor conducting metal cannot be sealed to glass if their diameter exceeds approximately .035 of an inch. Moreover, if a good conductor is employed for the electrodes, the maximum diameter which can be tolerated is even smaller owing to the fact that the coefficients of thermal expansion of good conducting materials are relatively high compared to that of glass. Consequently, relatively small wire-electrodes must be employed in these prior art diodes, thereby limiting their power handling capacity.

Still other disadvantages which flow from the use of wire electrodes sealed to a glass envelope are that the resultant diodes are incapable of being utilized as plug-in units, and stresses formed in the glass when it is sealed to the electrodes frequently cause disintegration of the envelope. In fact, even when the glass is annealed to reduce these stresses, a small amount of manipulation of the wire electrode, as in connecting the diode into a circuit, for example, is often sufficient to cause failure of the diode through cracking of the glass housing.

As pointed out hereinabove, the principal disadvantage of the prior art glass sealed diodes which employ associated Kovar sleeves is that the electrodes are seldom if ever hermetically sealed to their associated Kovar sleeves, or in other words, seldom provide gas tight seals. However, this form of prior art diode is also limited by many of the disadvantages inherent in the prior art diodes wherein the glass housing is directly sealed to the electrodes. For example, the diodes employing sleeves are also relatively prone to mechanical failure and breakage; in addition, the utilization of Kovar sleeves and the conventional processes for joining these sleeves to glass tubes has resulted in the requirement that the glass portion of the housing be relatively thick and bulky, thereby detracting considerably from the volumetric efficiency of the package.

Another extremely significant disadvantage of all of the prior art glass sealed diodes is that the final sealing of the package is accomplished by the application of heat to the package in the immediate vicinity of the semiconductor crystal, thereby subjecting the crystal to temperatures which are sufficiently high to be injurious to its crystalline structure. Moreover, sputtering of the materials being joined, and other allied phenomena, frequently cause contamination of the crystal surface. A typical example of these allied phenomena is contamination of the semiconductor crystal by solder and solder flux.

The present invention, on the other hand, obviates the above and other disadvantages of the crystal rectifiers of the prior art by providing a glass sealed crystal rectifier the housing of which incorporates all of the features of the ideal envelope for semiconductor diodes. According to the basic concept of the invention, there is provided a hermetically sealed crystal rectifier which comprises an envelope or housing subassembly, a contact spring or whisker subassembly, and a crystal subassembly, all three of which have outside diameters of the same order of magnitude, the housing subassembly being composed of a glass cylinder and one or more cylindrical Kovar shells which are sealed to the ends of the glass cylinder to effectively extend the cylinder along its external periphery. This basic combination, as described in detail hereinafter, may be employed with either point contact crystal rectifiers, fused junction rectifiers, semiconductor photocells, or large-area power rectifiers, utilizing either germanium or silicon crystal elements.

According to a preferred embodiment of the invention, the housing subassembly comprises a glass cylinder having two Kovar shells hermetically sealed to its ends. Each of the shells includes two end regions of different diameters which are separated by a shoulder region at its outer periphery and a relatively sharply tapered central region at its inner periphery, the outside diameter of the larger end region being substantially the same as the outside diameter of the glass cylinder, while the outside diameter of the smaller end region is substantially the same as the inside diameter of the glass cylinder. In the fabrication of the housing subassembly, the smaller ends of the shells are inserted into the glass cylinder until the ends of the cylinder register with the shoulder regions of the shells. Heat is then applied to affect two glass-to-metal seals between the cylinder and the shells, the ends of the glass cylinder flowing with the application of heat so that the seal region between the cylinder and each shell extends over all of the smaller end region of the shell and over substantially all of its shoulder central region.

In the preferred embodiment of the invention, both the whisker and crystal subassemblies include a cylindrical metal plug the outside diameter of which is substantially the same as the inside diameter of the larger end region of the shells which constitute the ends of the housing subassembly. In addition, the metal plugs are preferably beveled at one end so that if inserted alone into the housing subassembly, they would engage the tapered region of its shell members.

The contact spring subassembly employed in the crystal rectifier of the invention comprises one of the aforementioned metallic plugs and a spring element which is welded to the associated plug at its beveled edge and thereafter kinked to provide a C-shaped or S-shaped spring contact electrode, the kink formed therein serving to provide resiliency in a manner well known to the art. The other metallic plug, on the other hand, is utilized for mounting the semiconductor crystal element, and together with the crystal element constitutes the crystal subassembly employed in the preferred embodiments of the crystal rectifier of the invention. It should be pointed out that the term "contact spring" is considered generic to both point contact whisker electrodes as utilized in point contact crystal rectifiers, and ohmic contact spring elecrodes as utilized in fused junction and power rectifiers.

In the preferred embodiment of the invention, both the crystal and contact spring subassemblies are hermetically sealed to the housing subassembly by a novel welding technique which utilizes a plurality of overlapping spot welds for producing two continuous seam welds between the metal plugs of the whisker and crystal subassemblies and the respectively associated Kovar shells of the housing subassembly. The two welding operations may be carried out as successive steps of the final assembly operation, or as two separate processes simultaneously.

More particularly, according to one method of the invention the contact spring subassembly is first welded to one of the shell members of the housing subassembly by first chucking the contact spring and housing subassemblies in two aligned rotatable collars, and then advancing one of the collars so that the contact spring end of the subassembly's plug member is inserted into and bottomed against the shell member at one end of the housing assembly. A welding wheel electrode is then placed against the outer periphery of the shell member adjacent its region of engagement with the contact spring subassembly, after which the collars holding the two subassemblies are energized to rotate the subassemblies at a predetermined speed. Electrical energy is then applied between the welding wheel electrode and the metallic plug of the contact spring subassembly to effect a hermetically sealed weld between the two subassemblies.

After the joining of the spring and housing subassemblies, the operation is gain repeated by welding the crystal subassembly to the other end of the housing assembly. In carrying out this operation, however, the crystal subassembly is advanced into the housing subassembly only until the crystal element mounted thereon is engaged by and properly stressed against the contact spring previously positioned within the housing subassembly. The crystal subassembly is then seam welded to the housing subassembly to provide a compact, unitary, hermetically sealed, high-power crystal rectifier. Owing to the fact that the seam welding generates only very localized heating effects, the final sealing operation has substantially no effect whatsoever on the semi-conductor crystal.

According to another embodiment of the invention, the metallic plug employed in the crystal subassembly is fabricated from Kovar and is shaped at its crystal mounting end to have the same external configuration as the Kovar shells utilized in the preferred embodiment of the invention, as outlined above. The Kovar plug is then sealed directly to one end of the glass tube of the housing subassembly without the use of an intervening Kovar shell. However, if this process is carried out, the crystal element should be mounted on its associated plug member after the plug member has been sealed to the glass housing. A similar process, of course, could be utilized for joining the whisker subassembly to the other end of the housing subassembly; however, a shell-to-plug welded seal should be utilized in at least one end of the crystal rectifier to permit the crystal element to be mounted without therefore after being subjected to excessive heat.

According to the invention, the seam welding process whereby two or more of the diode subassemblies are joined together is carried out by impressing an alternating current voltage on the welding wheel electrode as the subassemblies are rotated. Each half cycle of the welding current produces one spot weld between the metal plug and Kovar sleeve being welded together, each spot weld extending along an arc longer than the arc traversed by the welding wheel during the half-cycle period. Accordingly, since welding takes place during each and every half cycle of welding current, a continuous seam weld of overlapping spot welds is formed between the plug and shell over the entire circumference of their region of engagement.

Still another feature which further distinguishes the crystal rectifier of the invention over those of the prior art is the utilization of magnetic material in the metallic plug which seals one end of the housing subassembly, and a non-magnetic plug for sealing the other end of the housing subassembly. This novel feature permits the rapid determination of the polarities of a large number of diodes by merely employing a magnet to pick them up.

A further feature of the invention which is generic to all embodiments thereof resides in the method by which the whisker element is affixed to the associated whisker plug. By spot-welding an unkinked whisker to the beveled edge of the plug, sufficient clearance is provided between the welding electrode and whisker to permit the welding process and the whisker kinking process to be performed in one continuous operation.

It is, therefore, an object of the invention to provide a hermetically sealed crystal rectifier wherein the crystal element is mounted within a miniaturized cylindrical housing whose central region is composed of glass and whose end regions are metallic, the end regions forming gas tight seals with the central region.

Another object of the invention is to provide a hermetically sealed, high-power crystal rectifier which includes a cylindrical housing having a glass tube in its central region and two metallic end regions, and a semiconductor crystal mounted within the chamber defined by the glass tube and the end regions.

A further object of the invention is to provide a hermetically sealed crystal rectifier which includes a contact spring subassembly, a crystal subassembly and a housing subassembly, all of substantially the same outside diameter and integrally combined, the housing subassembly including a glass tube and at least one Kovar shell sealed to the glass tube at one end thereof.

It is also an object of the invention to provide a crystal rectifier which includes a housing subassembly comprising a glass tube and a pair of Kovar shells hermetically sealed to the ends thereof, each of the shells including two end regions of different diameter separated by a shoulder region, the glass tube being sealed to the shells over substantially all of the outer periphery of their smaller end regions and their shoulder regions.

Another object of the invention is to provide a hermetically sealed crystal rectifier which includes a contact spring subassembly, a crystal subassembly and a housing subassembly all integrally joined, the housing subassembly including a glass tube and two metallic sleeves sealed to the ends thereof, each of the contact spring and crystal subassemblies including a metallic plug having substantially the same diameter as that of the glass tube, the two metallic plugs being inserted in and welded to the metallic sleeves sealed to the glass tube.

A still further object of the invention is to provide a crystal rectifier wherein one electrode is fabricated from magnetic material and the other electrode is fabricated from non-magnetic material to facilitate determination of the rectifier's polarity.

An additional object of the invention is to provide a crystal rectifier wherein the whisker subassembly includes a cylindrical metal plug beveled on one end and a resilient contact spring welded to the plug at its beveled region.

Another object of the invention is to provide methods for carrying out in one continuous operation the steps of spot welding the spring element of a crystal rectifier to an associated plug electrode, and forming a resilient configuration in the spring element.

Still another object of the invention is to provide a method for seam welding a metal shell to a metallic plug inserted therein by producing a plurality of overlapping spot welds about their circumference.

It is a further object of the invention to provide a method for seam welding a Kovar sleeve to a metallic plug electrode sealed therein by rotating the combination and impressing an alternating current welding signal between the plug electrode and a welding electrode in contact with the outside of the sleeve, each two adjacent half cycles of the welding signal producing two overlapping spot welds between the sleeve and the plug electrode.

Still other objects and advantages of the invention herein disclosed will become apparent when considered in connection with the accompanying drawings in which several embodiments of the invention are illustrated by way of example. It is to be expressly understood, however, that the drawings are for purposes of illustration and description only, and should not be construed as limiting the breadth and scope of the invention.

Figure 1:
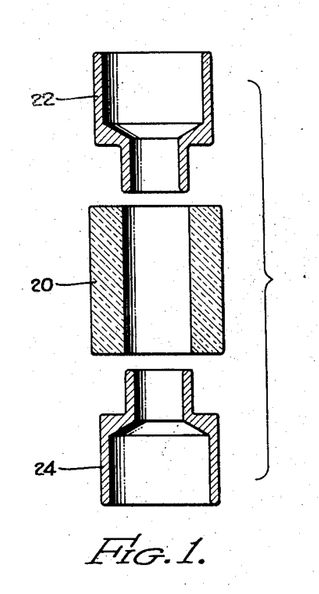
Fig. 1 is a sectional view of the basic elements from which is formed the housing subassembly employed in the crystal rectifier of the invention.

Referring now to the drawings, wherein like or corresponding parts are designated by the same reference characters throughout the several views, there is shown in Fig. 1 the several component elements which are utilized in the fabrication of the housing subassembly employed in the preferred embodiment of the crystal rectifiers of the invention. As shown in Fig. 1, the housing subassembly comprises three elements, namely, a glass tube 20, preferably cylindrical in configuration, and a pair of identical metallic shell members 22 and 24, respectively, which are to be sealed to cylinder 20.

Shell members 22 and 24 are also preferably of cylindrical configuration and each include two end regions of different diameters which are separated by a relatively sharply tapered central region at its inner periphery and a shoulder region at its outer periphery. The outside diameter of each of the smaller end regions is substantially the same as the inside diameter of glass tube 20, while the outside diameter of each of the larger end regions is of the same order of magnitude as the outside diameter of the glass tube. It will be noted that in the particular embodiment shown in Fig. 1, the external periphery opposite the tapered central region of each of the shell members is actually at right angles to the external periphery of its associated end regions.

Each of the shell members is preferably constructed of a metal or metallic alloy having a coefficient of thermal expansion substantially the same as the coefficient of thermal expansion of the glass which constitutes tube 20. One material which is especially suitable for shell members 22 and 24 consists of an alloy of cobalt, nickel, and iron, and is better known by the trade name Kovar. Still other alloys having similar characteristics are disclosed in U.S. Patent Number 1,942,260, issued January 2, 1934 to Howard Scott for "Alloy."

Glass tube 20 is preferably composed of a relatively hard glass, such as Corning 7052 Kovar-sealing hard glass, for example. It should be expressly understood, however, that other types of glass are also utilizable in the housing subassemblies employed in the crystal rectifiers of the invention, so long as several criteria are met. Firstly, the glass should be capable of forming a glass tight or hermetic seal with shell members having outside diameters of the order of .050 of an inch at their smaller ends. Secondly, after being sealed to the shell members the glass should be structurally sound and relatively free from stresses.

In the fabrication of the housing subassembly, the smaller ends of shell members 22 and 24 are first inserted into glass tube 20 so that the ends of the tube register with the outer periphery or the shoulder regions of the shell members. Heat is then applied to the tube at the region of its engagement with each of the shell members in order to create two glass-to-metal seals between tube 20 and shell members 22 and 24, respectively. Although the heat for producing the seals may be obtained from either radio-frequency induction heating apparatus, radiant heating apparatus, a gas flame or an oven, it has been found in practice that radio-frequency induction heating is preferred, especially if a relatively hard glass, such as the aforementioned Corning 7052 glass, is utilized in the housing subassembly.

More particularly, radio-frequency induction heating apparatus has been found to facilitate the sealing operation when relatively hard glasses having concomitantly high softening temperatures are utilized in the housing subassembly. The softening range of Corning 7052 glass, for example, is from approximately 750° C. to 1100° C. Consequently, temperatures of the order of 1000° C. are required to provide a good hermetic seal between the shell members and a cylinder composed of this particular glass.

Figure 2:
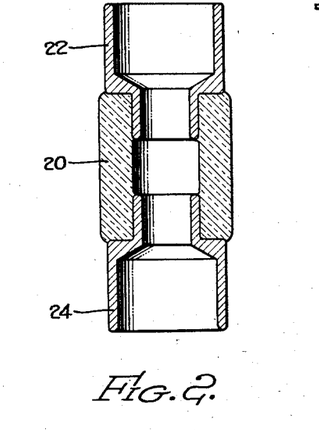
Fig. 2 is a sectional view of a preferred form of housing subassembly created by integrally joining the basic elements shown in Fig. 1.

With reference now to Fig. 2, there is shown the completed housing subassembly after shell members 22 and 24 have been sealed to tube 20. It will be noted that the glass of tube 20 has flowed at its ends so as to provide two hermetic seals with shell members 22 and 24, respectively, each of these seals extending over substantially all of the shoulder region of the associated shell member, as well as over the external periphery of its smaller end region. It will also be noted that the combination of the shell members and glass tube 20 provides a cylindrical housing subassembly having metallic end regions separated by a glass central region, the outside diameter of the end regions being of the same order of magnitude as the outside diameter of the glass central region. When utilized in miniaturized crystal rectifiers, typical dimensions for the subassembly are

|  | Inches |
|---|---|
| Overall length | .240 |
| Outside diameter of end regions | .087 |
| Outside diameter of glass central region | .105 |
| Thickness of Kovar shell | .007 |
| Thickness of glass | .030 |

The next operation to be carried out in the construction of the crystal rectifier of the invention is the fabrication of the crystal and contact spring subassemblies which are subsequently combined with the housing subassembly of Fig. 2 in accordance with the methods of the invention. In order to facilitate the description of the invention and to most suitably illustrate its generic concepts, the construction of a point contact crystal rectifier will first be described, after which other types of crystal rectifiers embodying one or more of these basic concepts will also be disclosed.

According to the invention, the contact spring subassembly utilized in all of the crystal rectifiers of the invention includes a cylindrical plug whose outside diameter is substantially the same as the inside diameter of the larger end regions of shell members 22 and 24, the plug preferably being beveled at one end. In addition, the contact spring subassembly for the point contact rectifier includes a whisker element formed into a resilient configuration and spot welded to the beveled end of the plug.

Figure 3A:
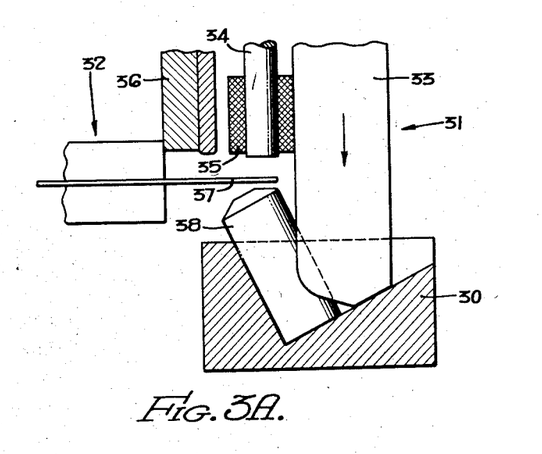
Figs. 3A and 3B are diagrammatic views, partly in section, of one form of apparatus which may be utilized for affixing the contact spring of the contact spring subassembly to its associated metallic plug member.
Figure 3B:
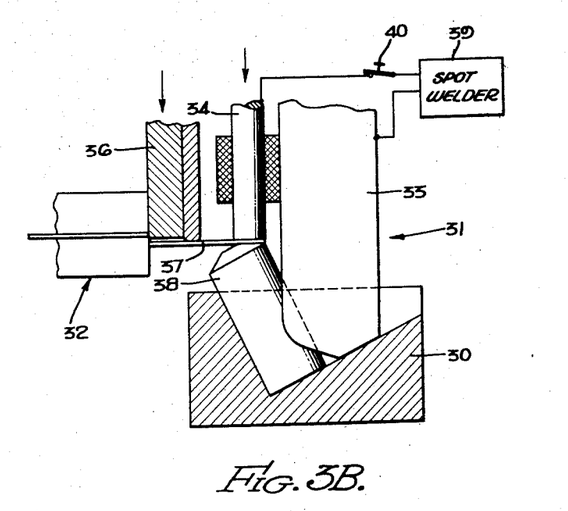

With reference now to Figs. 3A and 3B, there is shown one form of apparatus which may be utilized for partially fabricating the contact spring subassembly for the point contact crystal rectifier. As shown in Fig. 3A, the apparatus includes three basic components, namely, a slotted plug holder 30, a vertically movable whisker-cutting and welding-head assembly, generally designated 31, and a whisker wire feed assembly, generally designated 32, only a portion of which is shown. Whisker-cutting and welding head assembly 31 includes a first welding electrode 33 which is also utilized for clamping the whisker subassembly's plug in plug holder 30, a second welding electrode 34 vertically movable independently of electrode 33 but in a guide member 35 affixed to electrode 33, and a cutting element 36 vertically movable independently of both electrodes 33 and 34 and adapted to cooperate with the right hand surface of whisker wire feed assembly 32, as viewed in Fig. 3A, for cutting predetermined lengths of a whisker wire 37 fed through the wire feed assembly.

In operation a whisker plug, such as plug 38, is first positioned in plug holder 30 with its beveled end uppermost, after which electrode 33 is moved vertically downward to clamp the plug firmly within the holder. Whisker wire feed assembly 32 is then energized through an associated mechanism, not shown, to advance whisker wire 37 a predetermined distance, this distance being preselected so that the end of the whisker wire extends across the beveled portion of plug 38, as shown in Fig. 3A. It will be recognized, of course, that the distance between plug 38 and the cutting surfaces of feed assembly 32 and cutting element 36 should be carefully controlled to insure that upon completion of the whisker spot welding operation there is a sufficient length of whisker wire attached to plug 38 to enable the formation therein of the desired resilient configuration.

After the whisker wire has been advanced the proper distance, welding electrode 34 is moved vertically downward, as shown in Fig. 3B, to move the free end of the whisker wire into engagement with the beveled surface of plug 38. Electrical energy is then supplied through electrodes 33 and 34 from a spot welder source 39 upon closure of a switch 40 to spot weld the end of the whisker wire to the beveled surface of the whisker plug. Finally, cutting element 36 is also moved vertically downward to engage and cut the whisker wire at the point where it protrudes from the whisker wire feed assembly. A whisker element of predetermined length is thus affixed to whisker plug 38; consequently, the only operation remaining in the fabrication of the whisker subassembly is the shaping of the whisker element into a resilient configuration.

Figure 4:
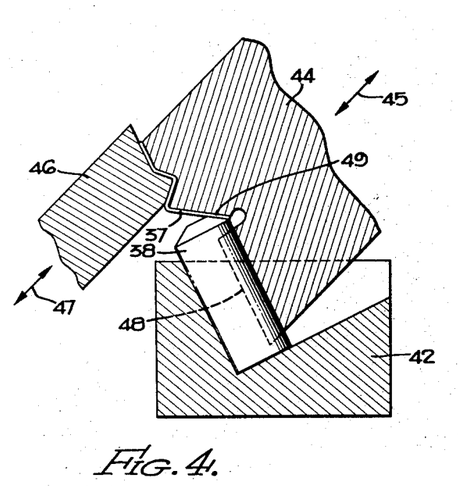
Fig. 4 is a diagrammatic view, partly in section, of a prefererd form of contact spring subassemby which is employed in the point contact crystal rectifier of the invention, and illustrates one form of apparatus which may be utilized for bending the contact spring to a resilient configuration.

With reference now to Fig. 4, there is shown one form of apparatus which may be employed for forming or shaping whisker element 37 to an S-shaped configuration. Basically, the apparatus includes another slotted plug holder 42, a clamping die 44 movable in the directions of the double headed arrow 45, and a forming die 46 movable in the directions of the double-headed arrow 47. As shown in Fig. 4, dies 44 and 46 include mating surfaces for forming the curves in an S-shaped whisker element, clamping die 44 also including a clamping cup 48 shaped to grasp plug 38, and an anvil 49, for firmly engaging whisker element 37 at the region it is spot welded to plug 38. Prior to the performance of the whisker shaping operation, of course, dies 44 and 46 are retracted to enable the whisker plug to be inserted in holder 42.

In operation, whisker plug 38 is first positioned in holder 42 so that its whisker element is substantially horizontal and in the same vertical plane as the direction of travel of dies 44 and 46. Clamping die 44 is then moved forward to clamp plug 38 in holder 42, after which die 46 is moved forward to engage whisker element 37 and force its free end upward and to the right, as viewed in Fig. 4, until the whisker element is bent to the well known S-configuration shown in Fig. 4.

It will be recognized that whisker element 37 may be composed of any of the conventional whisker materials known to the art, such as platinum, platinum-iridium, tungsten, aluminum, molybdenum or Phosphor bronze, for example. On the other hand, if it is desired to produce what has come to be known in the art as a "gold bonded" germanium crystal rectifier, the whisker element may be composed of an alloy of the order of 99% gold and 1% gallium, for example. It should also be pointed out that the apparatus of Figs. 3A and 3B is capable of cutting the end of the whisker element so as to provide either a flat blunt end or a knife edge, depending upon which is desired. More particularly, if it is desired to form a knife edge whisker point, the cutting surfaces of cutting element 36 and wire feed assembly 32 in Fig. 3A need only be oriented at the desired angle with respect to the axis of whisker wire 37 at the point where it is expelled from the whisker wire feed assembly.

With regard to the composition of whisker plug 38, the only limitation placed upon the material from which it is fabricated is that the material be capable of being welded to Kovar. However, according to one of the basic features of the invention, the whisker plug is preferably composed of nonmagnetic material, such as stainless steel, for example, while the plug employed in the crystal subassembly, as described hereinbelow, is composed of magnetic material. Accordingly, if this teaching of the invention is followed, orientation of the whisker and crystal ends of the completed crystal rectifiers may be accomplished by merely employing a magnet for picking up the completed devices.

The crystal subassembly employed in the crystal rectifiers of the invention is similar to the above-described contact spring subassembly in that it also includes two basic elements, one of which is a metallic plug whose outside diameter is again substantially the same as the inside diameter of the shell members which form the ends of the housing subassembly. The material from which the plug is constructed is preferably different, however, as will be described in detail hereinafter. In addition to the crystal plug, the crystal subassembly also includes a crystal element of semiconductor material which is affixed to one end of the crystal plug. For purposes of description, it will be assumed hereinafter that the crystal element is composed of an intrinsic semiconductor, such as silicon or germanium; it is to be expressly understood, however, that the basic concepts of the invention are not to be limited by these two particular semiconductors, and that crystal rectifiers constructed according to the basic concepts disclosed herein may employ other forms of semiconductors, such as intermetallic compounds, for example.

Figure 5A:
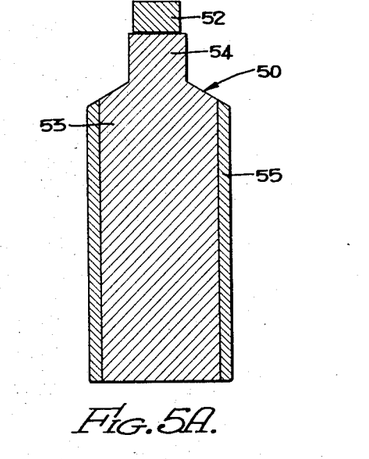
Figs. 5A, 5B and 5C are sectional views of a preferred form of crystal subassembly which is employed in the point contact crystal rectifier of the invention, Figs. 5B and 5C illustrating apparatus for mounting and etching the crystal element of the subassembly.

With reference now to Fig. 5A, there is illustrated a preferred form of crystal subassembly which includes a crystal plug 50 and a semiconductor crystal element 52 ohmically connected to the crystal plug. As shown in Fig. 5A, crystal plug 50 includes a massive cylindrical region 53 and a projecting end region 54 of smaller diameter on which the semiconductor crystal element is mounted.

According to the invention, the central core of plug 50, including its projecting end region 54, is preferably composed of a good electrical and thermal conductor, such as copper or silver, thereby providing a low impedance electrical connection to the crystal element and a heat sink for conducting away from the crystal element heat generated therein when the completed crystal rectifier is placed in operation. If either of these materials or their equivalent is utilized, however, the central core of region 53 should be clad with a layer 55 of a metal, which is easily welded to Kovar. This metal should have a melting point appreciably lower than that of Kovar and have a resistivity of the same order of magnitude. Further, upon being heated it should wet Kovar. One particular metal which has been found to be especially suitable for cladding the crystal plug consists essentially of about 80% silver, 15% copper, and 5% phosphorus. It will of course be recognized that satisfactory results may also be achieved by omitting the last constituent.

Crystal element 52 is cut from an ingot of semi-conductor material and is preferably either a single crystal or a polycrystalline specimen composed of relatively large single crystals; in other words, the crystal element should be substantially free from grain boundaries so that the statistical possibility of contacting a grain boundary with the whisker element during the final assembly operation is relatively remote. The resistivity, conductivity type and the active impurity concentration of the crystal element will obviously be preselected in accordance with procedures well known to the art to provide the electrical characteristics desired in the completed crystal rectifier. For example, if it is desired to produce a "gold bonded" germanium point contact diode, crystal element 50 may be composed of approximately 5 ohm-centimeter n-type germanium doped with antimony.

It will, of course, be recognized by those familiar with the semiconductor art that an n-type germanium crystal is preferred in germanium point contact rectifiers, owing to the fact that its lifetime, the drift mobility of its current carriers, and its relatively low contact potential all contribute to improved electrical characteristics in the completed device. It should also be noted that the electrical characteristics of the completed rectifiers are not only dependent upon the resistivity and conductivity type of the semiconductor material, but are also dependent upon the material of the whisker element, the etching processes utilized for cleansing the crystal element, the process and materials used for mounting the crystal element on its associated plug electrode, and the electrical pulsing or forming process utilized for establishing the rectifying boundary within the crystal element after the rectifier has been assembled.

Figures 5B, 5C:
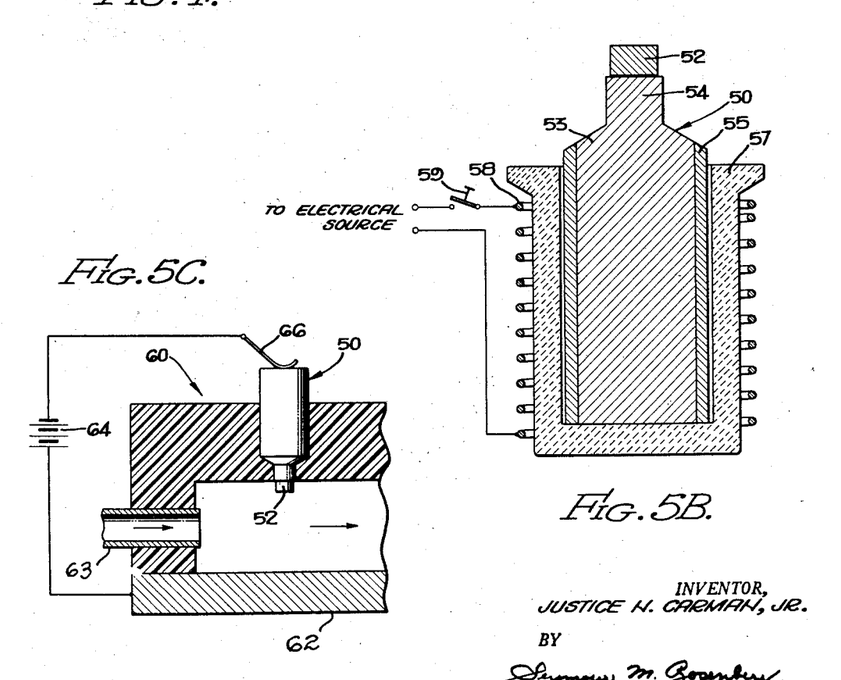

Referring now to Fig. 5B, one suitable process for soldering crystal element 52 to crystal plug 50 will be described. The crystal plug is first inserted in a ceramic holder 57 which is surrounded by a heater coil 58 energizable from a source of electrical energy, not shown, upon closure of a switch 59. After the crystal plug has been inserted in the holder, switch 59 is closed and plug 50 is heated to a predetermined value of temperature within the range from 300° C. to 450° C. The specific temperature utilized depends upon the composition and characteristics of the solder to be employed in the mounting operation. For example, one solder which has been found especially suitable contains 97½% lead and 2½% solder, and is employed with plug 50 heated to approximately 450° C. After the crystal plug has been heated, a solder flux, such as hydrozine hydrobromide, is then applied to the top of the crystal plug, after which solder, preferably in granulated form, is placed on top of the plug. The crystal element, which has previously been cleansed by a suitable etchant, is then placed in turn on top of the crystal plug, substantially as shown. After the solder has completely wet the adjacent surfaces of crystal element 52 and plug 50, the combination is removed from holder 57 and allowed to cool.

It is to be expressly understood, of course, that still other techniques and materials known to the art may be utilized for mounting the crystal element on its associated plug. For example, the crystal can be mounted by utilizing in lieu of solder a thermosetting resin having dispersed therein many finely divided particles of a good conductor, such as silver or gold. There are essentially only three basic limitations on the processes and materials which may be utilized for mounting the crystal. Firstly, the temperature to which the crystal element is heated should be below the temperature above which the crystalline structure of its semiconductor material is adversely affected; for germanium this temperature is approximately 450° C. Secondly, the material utilized as the bonding agent should be capable of withstanding ambient temperatures at least as high as those normally encountered in operation, and preferably temperatures as high as 200° C. Thirdly, but certainly not least important, the material utilized as the bonding agent should provide a mechanically sound low impedance electrical connection between the plug and the crystal element.

After the crystal element has been mounted on the crystal plug, the only step remaining in the fabrication of the crystal subassembly is the final etching of the crystal element. This etching process may be carried out with any of numerous suitable etchants, such as sodium hydroxide or potassium hydroxide, for example, or the etchants known to the semiconductor art as CP4, Purdue etch, or WAG etch. With reference now to Fig. 5C, there is shown one form of apparatus, according to the invention, which has been found especially suitable for etching the crystal subassemblies of the crystal rectifiers of the invention. As shown in Fig. 5C, the apparatus includes a hollow etching basin 60, a portion of which is composed of Teflon, having an aperture in the shape of a crystal subassembly formed in one side thereof. The etching basin is enclosed by a stainless steel cathode 62, and also includes a stainless steel conduit 63 extending through its Teflon end wall.

In operation, the crystal subassembly is first inserted in the plug-shaped aperture in the wall of basin 60, substantially as shown in Fig. 5C, the portion of the wall which engages the necked down region of crystal plug 50 being so located that only crystal element 52 extends within the cavity of the etching basin. A source 64 of direct current potential is then connected to cathode 62 and the crystal subassembly, the negative terminal being connected to plug 50 through a brush 66. Simultaneously, a suitable etching solution, such as, for example, one consisting essentially of one-tenth normal sodium hydroxide, is injected through conduit 63 and against the semiconductor crystal element, thereby electrolytically etching its surface.

According to the present invention, the etchant is precluded from attacking crystal plug 50 owing to the fact that sodium hydroxide is incapable of wetting Teflon and cannot, therefore, seep up between the crystal plug and the adjacent wall of the aperture in the etching basin. After the surfaces of the crystal element have been thoroughly cleansed by the etchant, the crystal subassembly is removed from the etching apparatus and rinsed sequentially first in distilled water and then in acetone. The crystal subassembly is now ready to be combined with the housing and contact spring subassemblies previously described to provide an integrated unitary crystal rectifier.

Figure 6:
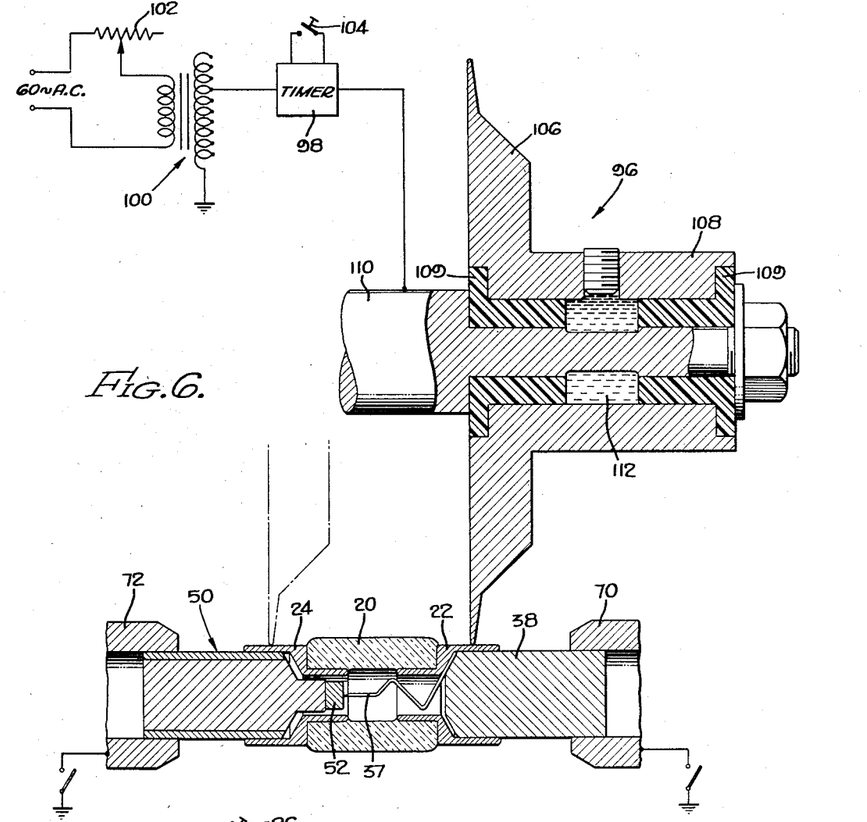
Fig. 6 is a sectional view of the point contact rectifier of the invention in the process of final assembly, and illustrates schematically a preferred form of apparatus for seam welding the housing subassembly to the crystal and contact spring subassemblies.

With reference now to Fig. 6, the final assembly operation is preferably performed by first inserting the whisker subassembly into one end of the housing assembly until whisker element 37 is bottomed against the internal tapered central region of shell member 22 of the housing subassembly. Shell member 22 is then preferably crimped with a suitable crimping tool to temporarily fasten the shell member to the whisker plug, after which the whisker plug, in turn, is inserted in and clamped by a rotatable collet 70. It should be pointed out that the crimping operation above referred to is advantageously performed immediately after the whisker element has been affixed to the whisker plug and shaped to its resilient configuration. In this manner, the housing subassembly serves to protect the relatively delicate whisker from being deformed through handling.

After whisker plug 38 has been inserted in collet 70, the steps of the final assembly operation may now be carried out in either of two analogous sequences. More particularly, whisker plug 38 may be welded to shell member 22 immediately, in accordance with the welding procedure to be described hereinafter, or the welding of shell member 22 to whisker plug 38 may be held in abeyance until the crystal subassembly has been positioned within the housing subassembly. Assuming that the latter operational sequence is to be employed in the final assembly operation, the crystal subassembly is next chucked in another rotatable collet 72, collet 72 being axially aligned with and movable toward collet 70. An associated mechanism, not shown in Fig. 6, is then actuated to advance collet 72 and the crystal subassembly to the right, as viewed in Fig. 6, until crystal plug 50 is inserted into shell member 24 of the housing assembly and initial contact is made between crystal element 52 and whisker element 37. The crystal subassembly is then advanced an additional predetermined distance to stress the whisker element against the crystal element. It will be recognized by those skilled in the art of crystal rectifiers that the additional distance which the crystal subassembly is advanced depends primarily on the type of crystal rectifier being constructed. For example, if the crystal rectifier is to be a standard type, i.e., one having a high peak inverse voltage, the additional advance distance is usually within the range from .002 to .004 of an inch, whereas if the crystal rectifier is to be utilized as ultra high frequency mixer, the additional advance distance is usually within the range from .0005 to .001 of an inch.

Figure 7:
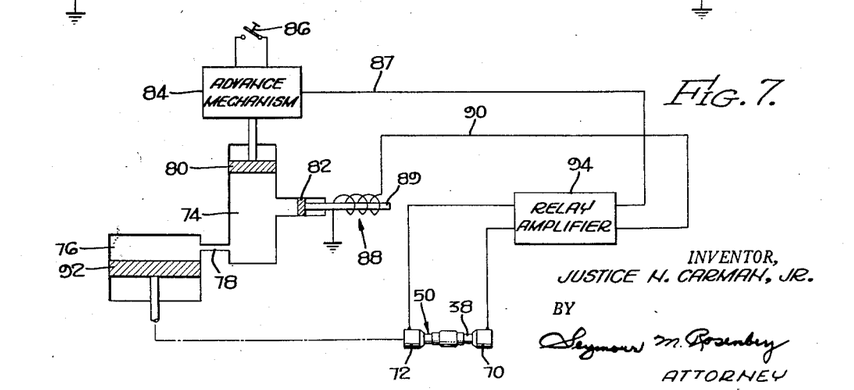
Fig. 7 is a schematic diagram of one form of apparatus which may be employed in the final assembly operation, prior to the final welding operation, for advancing the crystal and contact spring subassemblies toward each other until the contact spring is engaged with and is stressed against the crystal element.

Referring now to Fig. 7, there is illustrated one form of apparatus which may be utilized for carrying out the above described advance of the crystal subassembly. The apparatus includes a master cylinder 74 which is hydraulically connected to an output cylinder 76 through a fluid conduit 78, cylinder 74 having a small diameter relative to the diameter of the cylinder 76. As shown in Fig. 7, cylinder 74 has a pair of driving pistons designated 80 and 82, respectively, positioned therein, piston 80 being movable in a downward direction under the control of an advance mechanism 84, which in turn is actuatable in response to closure of a switch 86 and is deactuatable in response to an electrical signal received over an input conductor 87. Piston 82, on the other hand, is actuatable by a solenoid, generally designated 88, to whose plunger 89 the piston is connected. The solenoid, in turn, is energized in response to an electrical input signal received over an input conductor 90, and includes an adjustable stop mechanism, not shown, for controlling the stroke of solenoid plunger 89.

Output cylinder 76 is provided with a piston 92 which is mechanically coupled to collet 72 for advancing crystal plug 50 toward whisker plug 38 upon energization of the hydraulic system. In addition, the apparatus includes a relay amplifier 94 which is responsive to the initial electrical contact between the whisker and crystal elements of the rectifier undergoing assembly for applying electrical output signals to conductors 87 and 90.

In operation, after the subassemblies of the crystal rectifier being assembled have been chucked in collets 70 and 72, switch 86 is closed, thereby actuating advance mechanism 84 to move piston 80 in a downward direction. Consequently, piston 92 is actuated to advance collet 72 toward collet 70, or more specifically, to advance the crystal element toward the whisker element within the housing subassemby. This advancing operation continues until initial contact is made between the crystal and whisker elements, at which time relay amplifier 94 is actuated to in turn deactuate advance mechanism 84 and energize solenoid 88. Energization of solenoid 88 then functions to advance piston 82 a predetermined distance which is a function of the stroke to which plunger 89 is adjusted. The advance of piston 82, in turn, functions to advance crystal plug 50 the desired additional distance toward whisker plug 38, the magnitude of this distance being determined by the stroke elected for the plunger of solenoid 88. With reference once more to Fig. 6, the housing, crystal and whisker subassemblies are depicted in relative positions typical of those encountered at the completion of the above-described crystal advance operation. The subassemblies are now in position to be joined integrally by seam welding whisker plug 38 and crystal plug 50 to Kovar sleeves 22 and 24, respectively.

According to the invention, the welding operation is preferably carried out by utilizing a novel welding technique which creates each seam weld by producing a plurality of overlapping spot welds. As shown in Fig. 6, the welding apparatus preferably includes a welding wheel electrode, generally designated 96, which is movable into engagement with the periphery of the rectifier's shell members, electrode 96 being connected through a timer 98 to the multiple tapped secondary winding of a power transformer 100. The primary winding of transformer 100 is in turn connected to an alternating current source, not shown, through a rheostat 102. Timer 98 may be any of numerous commercially available electronic or electromechanical timers, and is energizable upon closure of a switch 104 for interconnecting the welding wheel electrode to transformer 100 for a predetermined time interval. In operation, the welding circuit is completed by grounding one end of the transformer secondary winding and collets 70 and 72.

Welding wheel electrode 96 is preferably constructed of a good conductor, such as Mallory No. 3, and includes a wheel portion 106 having a rim of predetermined thickness, and a hub portion 108 having a central cavity therein enclosed by a pair of bushings 109. The entire welding wheel electrode is rotatably mounted on a fixed shaft 110, which is preferably constructed of zinc-free bronze and is electrically connected to timer 98, a low impedance electrical commutator connection between electrode 96 and shaft 110 being provided by a pool 112 of liquid mercury contained within the cavity in the hub 108 of the electrode. The portion of shaft 110 journaled in bushings 109 is preferably plated with a material, such as chromium, which is relatively impervious to mercury, while bushings 109 are preferably fabricated from a material, such as nylon, which is not wetted by mercury. Consequently, the mercury in pool 112 cannot escape through nor attack the bearing surfaces. In a similar manner, the utilization of zinc-free bronze for shaft 110 substantially prevents erosion of the central region of the shaft by the mercury pool.

In addition to the apparatus shown in Fig. 6, the welding apparatus includes a tensioning apparatus, not shown, for forcing the welding wheel electrode against the crystal rectifier with a predetermined pressure. It should be pointed out that the relative dimensions of the elements shown in Fig. 6 are not necessarily the most desirable, and that the diameter of the welding wheel is preferably of the order of twenty times the diameter of the rectifier.

Consider now the operation of the welding apparatus in seam welding plugs 38 and 50 to shell members 22 and 24. After the whisker and crystal subassemblies have been positioned properly relative to each other by the advancing operation described hereinbefore, electrode 96 is moved into engagement with and tensioned against the periphery of one of the shell members, substantially as shown. Collets 70 and 72 are then actuated to rotate the component subassemblies of the crystal rectifier at a predetermined speed, the rotation of the housing subassembly in turn causing welding wheel electrode 96 to rotate. Switch 104 is then closed to actuate timer 98, which in turn functions to connect electrode 96 to transformer 100 for a predetermined number of cycles of the induced electrical signal, the number of cycles being a function of the rotational speed of the rectifier and the number of cycles per second of the energizing source. For example, if collets 70 and 72 rotate at a speed of 300 r.p.m. or 5 r.p.s., and the welding power is 60 cycle alternating current, then 12 cycles of welding power occur during one revolution of the rectifier. Consequently, if timer 98 interconnects welding wheel electrode 96 to the transformer for a period of thirteen cycles, for example, welding power is supplied throughout slightly more than one revolution of the rectifier.

Figure 8:
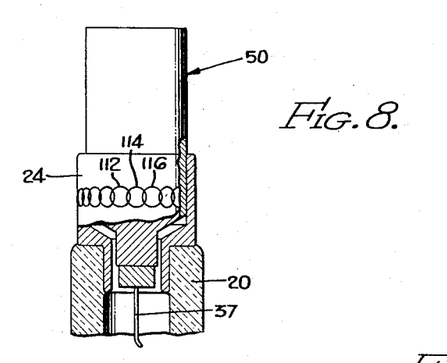
Fig. 8 is an elevational view, partly in section, of the crystal end of the point contact crystal rectifier of the invention illustrating the manner in which the welding apparatus of Fig. 6 creates a seam weld by producing a plurality of overlapping spot welds.

With reference now to Fig. 8, there is shown a portion of the point contact crystal rectifier of the invention, partly in section, illustrating the manner in which the seam weld is produced between shell member 24 and crystal plug 50. During each half cycle of welding current one spot weld is produced, the welding time for each spot weld obviously being smaller than the period of one-half cycle of the welding current, since no welding action takes place as the sinusoidal welding current passes through its zero current points. Accordingly, it is clear that a continuous seam weld is produced between the shell member and its associated plug member when the welding current is supplied throughout the interval required for the welding wheel electrode to traverse the entire periphery of the shell member.

The particular welding current utilized for producing the seam welds is best determined empirically, and is a function of several different factors, namely, the thickness and material of the shell members, the width of the rim of the welding wheel electrode, and the pressure with which the electrode is forced against the shell member. Although these parameters are not especially critical, excellent seam welds have been produced by utilzing Kovar shell members approximately .005 of an inch thick, a welding wheel electrode whose diameter is approximately one and one-half inches and whose rim is approximately .010 of an inch wide, and by forcing the welding wheel against the shell member with a force of approximately 5 pounds.

Thermally, perhaps, the physical description of the above described welding phenomenon may not be entirely accurate. It has been empirically determined that the thermal capacitance established by the heat produced at the previous spot is not appreciably dissipated when the succeeding spot is produced. This results in a continuous welding such as if the seam were to be welded by the application of D.C. In fact, much the same apparatus could be used and but for the switching problem, a D.C. welding system would be ideal.

Although, as set forth hereinabove, the seam welds are preferably produced by electrical welding, it has been found that cold welded seam welds may be produced with the identical apparatus shown in Fig. 6, but without utilizing any electrical energy. If it is desired to utilize this cold welding process, it is only necessary to increase the force with which welding wheel 96 is held against the shell members of the rectifier.

Figure 9:
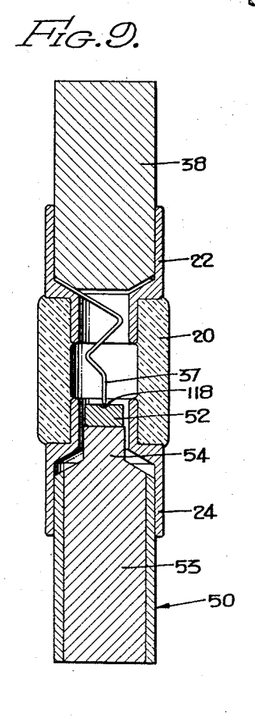
Fig. 9 is a sectional view of the completed point contact crystal rectifier of the invention.

With reference now to Fig. 9, the completed integral crystal rectifier of the invention is shown as it exists after the seam welding operation has been carried out at both its crystal and whisker ends. The only operational step now remaining is the process known to the art as "forming," wherein a current of predetermined magnitude is passed through the rectifier to produce a p–n junction in semiconductor crystal 52 immediately adjacent its region of engagement with whisker element 37. Assuming for purposes of illustration that the initial crystal was n-type germanium, the forming process produces a p-type region 118 in the crystal. If it is also assumed that whisker element 37 includes an acceptor impurity, such as gallium or indium, then the p-type region is doped with acceptor atoms by the forming process.

As will be noted from Fig. 9, the completed point contact crystal rectifier of the invention is essentially cylindrical in form and has two metallic end regions interconnected by a glass central region. Although, as shown in Fig. 9, the diameter of the glass central region may be slightly larger than the diameter of the metallic end regions, the ratio of these diameters never exceeds two-to-one. Consequently, the cross sectional area of the metallic end regions is never less than one-half the maximum cross sectional area of the rectifier, thereby providing an exceptionally rugged glass-sealed crystal rectifier capable of dissipating far larger amounts of power than any point contact crystal rectifier of the prior art. In addition, the relatively large end regions are sufficiently thick to be utilized directly with clip-in connectors. It is clear, of course, that in addition to the foregoing advantages, the point contact crystal rectifier of the invention still retains the advantages of all other glass-sealed rectifiers, the most important of which are a gas tight or hermetically sealed enclosure for the crystal element, and relatively low interelectrode capacity.

The foregoing description of the crystal rectifiers of the invention has thus far been restricted to the construction of the point contact rectifier shown in Fig. 9. It is to be expressly understood, however, that the basic features of the encapsulating package are equally applicable to other forms of crystal rectifiers, such as semiconductor photocells and fused junction semiconductor diodes, for example. In addition, it should be pointed out that the basic elements of the crystal, housing and contact spring subassemblies may be modified without departing from the motivating concept of the invention. In order to illustrate the versatility and applicability of the basic crystal rectifier enclosure of the invention, several of these modifications will be disclosed hereinbelow.

Figure 10:
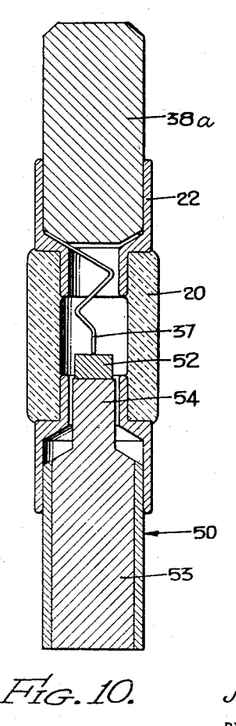
Fig. 10 is a sectional view of a semiconductor photocell, according to the invention, and illustrates several modifications which may be made in the housing and crystal subassemblies shown in Figs. 2 and 5A, respectively.

Referring now to Fig. 10, there is shown a point contact semiconductor photocell constructed in accordance with the invention. The principal difference between the photocell of Fig. 10 and the standard point contact rectifier of Fig. 9 is that semiconductor crystal 52 is preferably thicker and is mounted on a crystal plug, whose projecting end region 54 is longer than the corresponding portion of the crystal plug shown in Fig. 9. In this manner, the crystal element is positioned adjacent the glass wall of the central region of the photocell, substantially as shown, thereby enabling the generation of the maximum number of current carriers through photoexcitation.

It is clear, of course, that if the identical housing subassembly shown in Fig. 2 is to be utilized in constructing a point contact semiconductor photocell wherein the crystal element is positioned adjacent the glass central region, then the contact spring subassembly should include a shorter whisker element. However, if it is desired to utilize one basic contact spring subassembly in all point contact diodes, whether photocells or standard point contact rectifiers, the same result may be achieved by employing a housing subassembly in which glass tube 20, as shown in Fig. 10, is longer than the glass tube employed in the housing subassembly of the standard point contact rectifier.

It will be recognized that the glass central region of the photocell shown in Fig. 10 functions as a window to admit light from all directions. It should be pointed out, however, that the glass region may actually tend to diffuse incident light; consequently when the photocell is employed in conjunction with a point source of light, it may be desirable to coat a portion of the glass central region with a reflective material. If the photocell is then positioned with its coated side away from the light, both incident and reflected light are concentrated on the crystal element. Additionally, in the Figure 10 embodiment the upper end of plug member 38a has a taper which is the same as that on the lower end which fits into sleeve 22. This may in fact be the case with all embodiments in the interests of productive efficiency, i.e., it may be desirable to make both ends of the plug members identical to eliminate the possibility of mistakes in assembly.

Figure 11:
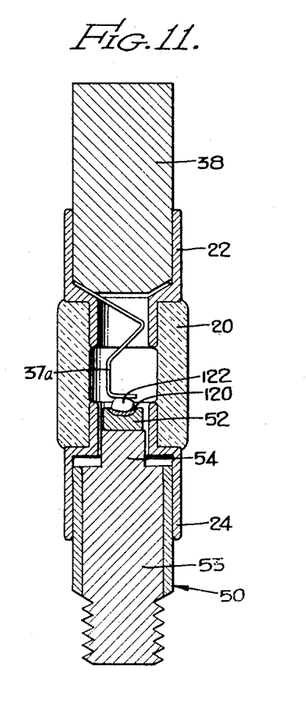
Fig. 11 is a sectional view of a fused junction crystal rectifier, according to the invention, and illustrates still other modifications which may be made in the basic subassemblies from which the crystal rectifiers of the invention are constructed.

With reference now to Fig. 11, there is shown a fused junction semiconductor diode, according to the invention, which includes a number of additional structural modifications in the basic rectifier housing described hereinabove. The distinctions between crystal element 52 and contact spring 37a and the corresponding elements previously described are, of course, the distinctions well known to the art and are not basic to the present invention. Briefly stated, crystal element 52 is formed by fusing an alloy pellet or wire, including a solvent metal and either an acceptor or donor impurity, to a crystallographically oriented crystal specimen whose conductivity type is determined by an active impurity of the type opposite to that which is employed in the alloy pellet or wire. At the conclusion of the fusion operation, a region 120 of the original crystal is regrown as semiconductor material whose conductivity type is opposite to that of the starting crystal, thereby creating a p–n junction. The solvent metal from the original alloy, in turn, freezes out at the end of the fusion operation as an alloy button 122 which is ohmically connected to region 120. Electrical connection between button 122 and metallic plug 38 is then made through a contact spring 37a, whose end is preferably flattened to facilitate the formation of a low impedance connection to the top of button 122. It should be pointed out that the end of contact spring 37 may be tinned if desired to permit the formation of a solder connection between spring 37 and button 122.

Returning once more to the encapsulating housing employed in the fused junction rectifier of the invention, it will be noted that shell members 22 and 24 are of substantially uniform thickness throughout their entire lengths, the ends of glass tube 20 again being sealed to the shell members over substantially all of their smaller ends and tapered central regions. Although the housing subassembly utilized in the fused junction rectifier shown in Fig. 11 has been found to be both practical and satisfactory, the housing subassembly shown in Fig. 2 is preferred for several reasons. Firstly, the use of shell members with thicker central regions permits the larger ends of the shell members to be deformed at will after the housing subassembly has been fabricated, without any adverse effects to the glass-to-metal seals. Secondly, the use of shell members whose external central region is stepped at substantially 90 degrees, as shown in Fig. 2, provides glass-to-metal seals which have been found to be more rugged structurally. Nevertheless, shell members of the form shown in Fig. 11 do have one advantage in that they may be readily stamped from sheet stock.

Referring again to Fig. 11, still another modification in the basic crystal rectifier of the invention is the use of threads in the end of crystal plug 50 to facilitate mounting the device and to provide an electrical connection to the crystal element. In addition, crystal plug 50 is sharply stepped between its massive region 53 and its projecting end region 54, in counterdistinction to the tapered transition between the corresponding regions of the crystal plug shown in Fig. 5A. It is to be understood, therefore, that the basic concept of the invention is not to be limited by the specific configurations shown for the metallic plugs employed in the crystal and contact spring subassemblies.

Figure 12:
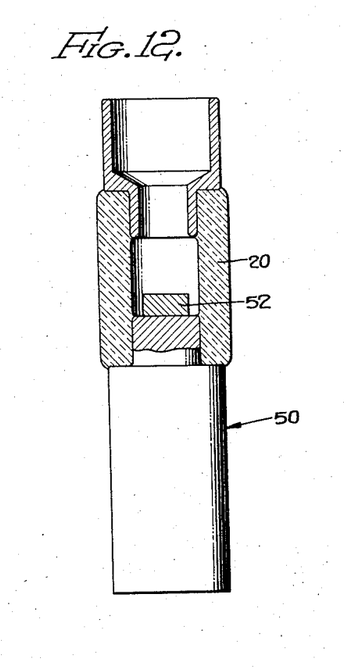
Fig. 12 is a sectional view of a modified form of combined crystal subassembly and housing subassembly wherein the crystal plug member is sealed directly to the glass tubing of the housing subassembly.

In all of the embodiments of the invention heretofore described, each housing subassembly illustrated includes a shell member at each of its ends. It is essential to point out, however, that the present invention is also intended to encompass the use of a shell member at only one end of the housing subassembly. With reference to Fig. 12, for example, there is shown a combined housing and crystal subassembly wherein crystal plug 50 is constructed entirely of Kovar and is sealed directly to one end of glass tube 20, only the other end of tube 20 being sealed to a shell member. It is obvious, of course, that if this form of construction is employed, crystal element 52 is preferably mounted on crystal plug 50 after the crystal plug has been sealed to the glass tube.

Figure 13:
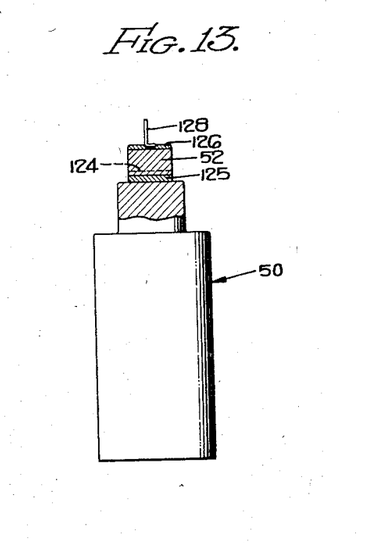
Fig. 13 is a side elevation, partly in section, of a modified form of crystal subassembly which may be employed in a power rectifier, according to the invention.

In each of the embodiments of the invention described hereinabove, it has also been assumed that the rectifying connection to the crystal element is made opposite the surface of the crystal element which engages the crystal plug. Consequently, heat generated at the rectifying boundary in the crystal element must first be conducted through the bulk of the crystal before it can be dissipated in the crystal plug. It will be recognized, however, that the basic housing assemblies of the invention may also be utilized for crystal rectifiers in which the rectifying boundary is located immediately adjacent the crystal plug. With reference now to Fig. 13, for example, there is shown a crystal subassembly wherein crystal element 52 is again mounted on a crystal plug 50, but the rectifying boundary, as indicated by the dotted line 124, is created in the portion of crystal 52 adjacent plug 50 by utilizing a solder 125 which includes an active impurity of the type opposite to that which determines the conductivity type of the original crystal specimen. For example, if the starting specimen is N-type germanium, the solder employed for mounting the crystal may include indium or any other suitable acceptor impurity. It is clear, of course, that if the rectifying boundary is located adjacent the crystal plug, then an ohmic connection should be made between the crystal and the contact spring assembly. As illustrated in Fig. 13, one way of providing this low impedance connection is to plate a tin layer 126 on the crystal element opposite the crystal plug, layer 126 being connected to the contact spring plug, not shown, through a contact spring 128.

After the crystal rectifiers of the invention have been constructed according to the principles herein set forth, the electrical characteristics of the completed units are determined by appropriate electrical measurements after which the rectifiers are classified according to their characteristics. In order to make the classification readily ascertainable to the user of the rectifier, the unit is preferably color coded or stamped with a designation indicative of its classification.

Figure 14:
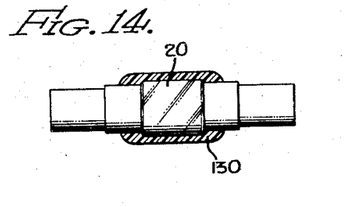
Fig. 14 is a side view, partly in section, of a crystal rectifier which is partially coated with a protective layer to render the rectifier especially shock resistant.

With reference now to Fig. 14, there is shown a crystal rectifier constructed according to the invention which has been color coded by coating the glass central region 20 with a layer 130 of colored Silastic, the particular color utilized indicating the rectifier's classification. In addition, the use of a Silastic layer even further increases the excellent shock resisting qualities of the rectifier, and also prevents any ambient light whatsoever from impinging on the semiconductor crystal element. Although the amount of light which normally strikes the crystal element in the standard uncoated crystal rectifier has no appreciable effect on the rectifier's electrical characteristics, there are some special purpose applications of crystal rectifiers wherein it is desirable to maintain the electrical characteristics as constant as possible. In these special applications, the use of a layer of Silastic or a similar material may be justified solely for its light shielding properties.

It is clear, of course, that each of the embodiments of the crystal rectifier of the invention is especially suitable for use with clip-in or fuse type electrical connectors. It is to be expressly understood, however, that lead wires may be readily attached to the metallic plugs of the crystal and contact spring assemblies, if it is desired to incorporate the rectifier into a circuit through the uitilization of conventional solder connections.

Figure 15:
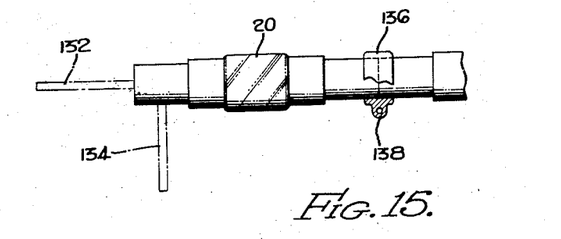
Fig. 15 is a schematic view, partly in section, illustrating various manners in which electrical connection may be made to the crystal rectifiers of the invention.

With reference now to Fig. 15, there is shown a rectifier of the invention illustrating three different techniques which have proven practical for electrically connecting to the rectifier's electrodes. Firstly, as shown by the dotted line 132 in Fig. 15, a lead wire may be butt-welded to the end of each plug member to provide the conventional form of end conductor. Secondly, as illustrated by the dotted line 134, the lead wires may be butt-welded to the sides of the plug members to provide a plug-in unit especially suitable for use with electrical socket connectors. The third technique illustrated in the drawings is utilized principally in applications wherein a pair of electrically matched rectifiers are to be interconnected either in series or in parallel, and involves the use of a sleeve connector 136 for electrically and mechanically interconnecting the metallic plug members of two abutting rectifiers. The sleeve may be either welded or soldered to each of the rectifiers, and preferably includes an eyelet 138 to facilitate making electrical connection to the common junction of the rectifiers.

It is obvious, of course, that numerous other modifications and alterations in the basic crystal rectifiers of the invention will be readily apparent to those skilled in the art. For example, it should be clear that the basic structure herein disclosed may be utilized for housing other forms of semiconductor devices. Again, the welding procedures of the invention, as set forth hereinabove, are also clearly applicable to the encapsulation of transistors. It should also be pointed out that where reference is made to specific semiconductor rectifiers, the particular combination of elements which provide the rectifying action is not intended to limit the scope of the invention. For example, in the point contact rectifier of Fig. 9 a gold antimony whisker element could be utilized in combination with a P-type semiconductor crystal without departing in the least from the spirit of the invention. Still another modification of the invention would be to employ the basic housing subassembly shown in Fig. 2 with a pair of plug members which are soldered therein. Although this particular utilization of the housing subassembly is not preferred, the same structural advantages provided by the housing subassembly itself could be gained. Accordingly, it is to be expressly understood that the scope of the invention is to be limited only by the breadth and spirit of the appended claims.

What is claimed as new is:

1. In a crystal rectifier, a housing subassembly comprising: a glass tube of substantially uniform cross sectional area and having first and second ends, said tube having predetermined inside and outside diameters; and first and second shell members composed of material having a coefficient of thermal expansion of the same order of magnitude as that of said glass tube, each of said shell members having first and second end regions separated by a shoulder region, the outside diameter of said first end region of each of said shell members being substantially the same as said predetermined inside diameter of said glass tube, the outside diameter of said second end region of each of said shell members being substantially greater than that of said first end region, said first and second ends of said glass tube being in register with the shoulder regions of said shell members and being fused to said first and second shell members, respectively, over substantially all of the outside periphery of their first ends and shoulder regions.

2. The housing subassembly defined in claim 1 wherein the end region of said shell members having relatively thin walls and wherein the shoulder regions are substantially perpendicular to the longitudinal axis of said glass tube.

3. In a crystal rectifier, a housing subassembly adapted to cooperate with a pair of metal plugs to provide a hermetically sealed cavity for encapsulating a semiconductor crystal having adjacent n-type and p-type regions separated by a rectifying barrier, said housing subassembly comprising: a tubular glass cylinder of substantially uniform cross sectional area, said cylinder having first and second ends and predetermined inside and outside diameters; and at least one relatively thin shell member composed of a material having a coefficient of thermal expansion of the same order of magnitude as that of said glass tube, said shell member having first and second end regions of different diameter separated by a shoulder region, the outside diameter of said first end region of said shell member being substantially the same as said predetermined inside diameter of said glass cylinder, the outside diameter of said second end region of said shell member being substantially greater than that of said first end region, said first end of said glass cylinder being fused to said shell member over the outside periphery of its first end and its shoulder region.

4. In a crystal rectifier of the type enclosed in a glass tube of substantially uniform cross section a crystal subassembly comprising: a semiconductor crystal element; a cylindrical crystal mounting plug having a massive body portion of substantially uniform diameter; said diameter of said massive body region being substantially the same as the mean diameter of said glass tube and a projecting end region, the diameter of said end region being of the order of one half the diameter of said body portion, said body portion extending into said shell and being sealed thereto; and means for ohmically connecting said crystal element to the end of said projecting end region whereby said massive body portion acts as a heat sink for heat generated within said crystal element.

5. A crystal rectifier comprising: a tubular glass cylinder having first and second ends; a first metallic electrode extending into said first end of said glass cylinder and hermetically sealed thereto, said first electrode being magnetically attractable; a second metallic electrode composed of non-magnetic material, said second electrode extending into said second end of said glass cylinder and being hermetically sealed thereto; a semiconductor crystal element mounted within said glass cylinder on one of said electrodes; and a resilient conductive member interconnecting said crystal element with the other of said electrodes whereby the relative positions of said crystal element and said resilient conductive member within said glass cylinder is determinable by sensing which electrode is attractable magnetically.

6. In a crystal rectifier which includes a semi-conductor crystal having adjacent n-type and p-type regions separated by a rectifying barrier, the combination comprising: a tubular glass cylinder for housing the crystal, said cylinder having first and second ends and predetermined inside and outside diameters; a pair of relatively thin metallic shell members having first and second ends separated by a stepped central region, the outside diameter of said first end of each of said shell members being substantially equal to said predetermined inside diameter, the outside diameter of said second end of each of said shell members being of the same order of magnitude as said predetermined outside diameter, said first and second ends of said glass cylinder being sealed to said first and second shell members, respectively, over substantially all of the external periphery of their first ends and stepped central regions; and a pair of metallic plug members of substantially cylindrical configuration, the diameter of said plug members being substantially equal to the inside diameter of said second ends of said shell members and of the same order of magnitude as said predetermined outside diameter, said first and second plug members being welded to the interior walls of said second ends of said first and second shell members, respectively.

7. The combination defined in claim 6 which further includes means for mounting the crystal on the end of said first plug member within said first shell member, and a contact spring for electrically connecting said second plug member to said crystal.

8. The combination defined in claim 7 in which said first plug member includes a projecting end region which extends into and terminates within said first end of said first shell member, and which further includes means for mounting the semiconductor crystal on said projecting end region with its n-type region in substantially ohmic contact with said first plug member, and a contact spring positioned within said glass housing for electrically interconnecting said second plug member with the p-type region of the crystal.

9. The combination defined in claim 8 wherein said contact spring comprises a point contact whisker element, said whisker element being welded at one end to said second plug member and being stressed at its other end against the p-type region of the crystal.

10. In a crystal rectifier which includes a semi-conductor crystal element, a hermatically sealed housing for encapsulating the crystal element and for providing electrical connection thereto, said housing comprising: a tubular glass cylinder having first and second ends and predetermined inside and outside diameters; first and second metallic plug members of substantially cylindrical configuration, the diameter of said plug members being larger than said predetermined inside diameter and of the same order of magnitude as said predetermined outside diameter; and a pair of stepped sleeve members for interconnecting said first and second plug members, respectively, with said first and second ends of said glass cylinder to form a hermatically sealed enclosure within which the crystal element is mounted, one end of each of said sleeves extending over at least a portion of the lateral periphery of its associated plug member and being seam welded thereto, the other end of each of said sleeves extending into the associated end of each glass cylinder and being sealed to said cylinder along the length of sleeve which extends within said cylinder.

11. The crystal rectifier housing defined in claim 10 wherein each of said stepped sleeves includes a sharply tapered central region separating said one end from said other end, the external periphery of said central region abutting the associated end of said glass cylinder and being sealed thereto.

12. The crystal rectifier housing defined in claim 11 wherein the external periphery of said tapered central region of each of said sleeves is substantially perpendicular to the longitudinal axis of said glass cylinder.

13. The crystal rectifier housing defined in claim 11 wherein the internal periphery and external periphery of said tapered central region of each of said sleeves each forms an angle within the range from 45° to 90° with the the longitudinal axis of said cylinder.

14. In a crystal rectifier, the combination comprising: a glass cylinder having first and second ends and predetermined inside and outside diameters; a metallic plug of substantially cylindrical configuration, the diameter of said plug being larger than said predetermined inside diameter and of the same order of magnitude as said predetermined outside diameter; and a relatively thin cylindrical metallic sleeve for concentrically interconnecting said plug member with said first end of said glass cylinder to hermatically seal said cylinder at said first end, said sleeve having one end region whose outside diameter is substantially the same as said predetermined inside diameter of said glass cylinder, which end region extends to a shoulder region whose outside diameter is greater than said predetermined inside diameter of said cylinder, the other end of said sleeve extending over at least a portion of the lateral periphery of said plug member and being seam welded thereto, said one end of said sleeve extending into said glass cylinder at said first end and being sealed to said cylinder along the length of sleeve which extends into said cylinder and along the outer periphery of said shoulder region.

15. The method of hermatically sealing a crystal rectifier by seam welding a metallic plug member to a metallic sleeve fitted thereover, said method comprising the steps of rotating the plug member and sleeve at a predetermined rate, and impressing an alternating current electrical signal across the plug member and the sleeve to produce a pair of overlapping spot welds between the sleeve and plug member for each two adjacent half cycles of the electrical signal.

16. The method of sealing a metallic plug member supporting an electrode of a crystal rectifier to a metallic sleeve sealed to one end of a glass envelope, said method comprising the steps of inserting at least a portion of the plug member into the sleeve, rotating the plug member and sleeve at a predetermined rate R, where R is the rotational speed in rotations per second, and impressing an alternating current electrical signal across the plug member and the sleeve for at least $$\frac{f}{R}$$

cycles of the alternating current signal, where $f$ is the frequency of the signal in cycles per second, to provide a continuous seam weld consisting of at least $$2\frac{f}{R}$$

overlapping spot welds between the plug member and the sleeve.

17. The method of sealing two metallic plug members and the two ends of a glass cylinder to two respectively associated sleeves to form a hermetically sealed housing for a semiconductor crystal element mounted on one of the plug members, said method comprising the steps of inserting one end of each of the sleeves into the two ends of the cylinder, respectively, heating the sleeves and the cylinder to a value of temperature whereat the glass of the cylinder becomes plastic and wets the ends of the sleeves inserted therein, cooling the sleeves and the cylinder to form a glass-to-metal seal between each sleeve and the cylinder, at least partially inserting the two metallic plug members into the other ends of the two sleeves, respectively, and seam welding each plug member to its associated sleeve.

18. The method defined in claim 17 wherein said seam welding step includes the steps of rotating the plug members, sleeves and cylinder at a predetermined rate, and impressing an alternating current electrical signal across each plug member and its associated sleeve at a point moving circumferentially around their region of engagement to produce an endless chain of overlapping spot welds between each plug member and its associated sleeve.

19. In a crystal rectifier, a crystal subassembly adapted to be hermetically sealed to a housing subassembly which includes as one of its elements a cylindrical glass housing having a predetermined inside and outside diameter, said crystal subassembly comprising: a metallic plug having a massive cylindrical body portion and a cylindrical end portion projecting concentrically from one end of said body portion, the core of said massive body portion being clad with a layer of an alloy whose melting point is appreciably greater than that of Kovar and whose resistivity is substantially equal to that of Kovar and which will wet Kovar upon being heated, said projecting end portion and at least the core of said massive body portion being composed of a metal having a relatively high coefficient of electrical and thermal conductivity, said body portion having a diameter of the same order of magnitude as the mean diameter of the glass housing, said end portion having a diameter substantially the same as said predetermined inside diameter of the glass housing and being fused thereto; a semiconductor crystal element; and means for mechanically mounting and ohmically connecting said crystal element to the end of said end portion of said metallic plug whereby a relatively large heat sink is provided for heat generated within said crystal element.

20. The combination defined in claim 19 wherein said alloy has a melting point which is appreciably lower than that of Kovar and whose resistivity is substantially equal to that of Kovar and which will wet Kovar upon being heated, said alloy being composed approximately of 5 percent phosphorus, 15 percent copper, and 80 percent silver.

21. In a crystal rectifier which includes a semi-conductor crystal having an n-type region contiguous with a p-type region, the combination comprising: a tubular glass cylinder for housing the crystal, said cylinder having first and second ends and predetermined inside and outside diameters; a pair of relatively thin metallic shell members having first and second ends separated by a stepped central region, the outside diameter of said first end of each of said shell members being substantially equal to said predetermined inside diameter, the outside diameter of said second end of each of said shell members being substantially greater than that of said first end, said first and second ends of said glass cylinder being sealed to said first and second shell members respectively, over substantially all of the external periphery of their first ends and stepped central regions, and a pair of metallic plug members, the main body portion of which is of substantially cylindrical configuration, the outside diameter of said main body portion being substantially equal to the inside diameter of said second ends of said shell members, said first and second plug members being sealed to said second ends of said first and second shell members to provide a hermetic seal therebetween; and electrically conductive means for connecting one of said plug members to the n-type region of the crystal and the other of said plug members to the p-type region of the crystal.

22. In a crystal rectifier which includes a semi-conductor crystal having an n-type region contiguous with a p-type region, the combination comprising: a tubular glass cylinder for housing the crystal, said cylinder having first and second ends; first and second metallic plug members having outside diameters of the same order of magnitude as the outside diameter of said glass cylinder, said first plug member being composed essentially of nonmagnetic metal and said second plug member being composed at least in part of a magnetic metal whereby the low impedance direction of the rectifier may be determined with the aid of a magnet; first means for hermetically sealing said first plug member to said first end of said glass cylinder; second means for hermetically sealing said second plug member to said second end of said glass cylinder; electrically conducting means for connecting one of said plug members to the n-type region of the crystal and the other of said plug members to the p-type region of the crystal.

23. The combination defined in claim 22 wherein said second plug member includes a core composed of a relatively good electrical conductor, and a layer of magnetic material cladding at least a portion of said core.

24. In a crystal rectifier which includes a semi-conductor crystal having adjacent n-type and p-type regions separated by a rectifying barrier, the combination comprising: a tubular glass cylinder for housing the crystal, said cylinder having first and second ends and predetermined inside and outside diameters; a pair of relatively thin metallic shell members having first and second ends separated by a stepped central region, the outside diameter of said first end of each of said shell members being substantially equal to said predetermined inside diameter, the outside diameter of said second end of each of said shell members being substantially greater than that of said first end, said first and second ends of said glass cylinder being sealed to said first and second shell members, respectively, over substantially all of the external periphery of their first ends and stepped central regions, and a pair of metallic plug members, the main body portion of which is of substantially cylindrical configuration, the outside diameter of said main body portion being substantially equal to the inside diameter of said second ends of said shell members, said first and second plug members being sealed to said second ends of said first and second shell members to provide a hermetic seal therebetween.

25. In a crystal rectifier which includes a semi-conductor crystal having adjacent n-type and p-type regions separated by a rectifying barrier, the combination comprising: a tubular glass cylinder for housing the crystal, said cylinder having first and second ends and predetermined inside and outside diameters; a pair of relatively thin metallic shell members having first and second ends separated by a stepped central region, the outside diameter of said first end of each of said shell members being substantially equal to said predetermined inside diameter, the outside diameter of said second end of each of said shell members being substantially greater than that of said first end, said first and second ends of said glass cylinder being sealed to said first and second shell members, respectively, over substantially all of the external periphery of their first ends and stepped central regions, and a pair of metallic plug members, the main body portion of which is of substantially cylindrical configuration, the outside diameter of said main body portion being mateable with the inside diameter of said second ends of said shell members, said first and second plug members being sealed to said second ends of said first and second shell members to provide a hermetic seal therebetween; and a pair of metallic plug members sealed to said second ends of said first and second shell members, at least one of said plug members having a massive cylindrical body portion and a cylindrical end portion projecting concentrically from one end of said body portion, said body portion having an outside diameter of the same order of magnitude as the mean diameter of said glass cylinder, said end portion having an outside diameter smaller than the inside diameter of said glass housing.

References Cited in the file of this patent

UNITED STATES PATENTS

| | | |
|---|---|---|
| 1,522,993 | Alexander | Jan. 13, 1925 |
| 1,601,927 | Tobey | Oct. 5, 1926 |
| 2,189,887 | Jones et al. | Feb. 13, 1940 |
| 2,204,549 | Murch | June 18, 1940 |
| 2,205,251 | Gillette | June 18, 1940 |
| 2,404,057 | Gustin et al. | July 16, 1946 |
| 2,482,902 | Clark | Sept. 27, 1949 |
| 2,532,907 | Hangosky | Dec. 5, 1950 |
| 2,632,042 | Fitchett | Mar. 17, 1953 |
| 2,694,168 | North et al. | Nov. 9, 1954 |
| 2,708,250 | Day | May 10, 1955 |
| 2,721,839 | Taylor | Oct. 25, 1955 |
| 2,725,505 | Webster et al. | Nov. 29, 1955 |
| 2,748,326 | Ingraham | May 29, 1956 |
| 2,751,529 | Stineman et al. | June 19, 1956 |
| 2,753,497 | Jenkins et al. | July 3, 1956 |
| 2,783,197 | Herbert | Feb. 26, 1957 |

OTHER REFERENCES

Yelton: Transactions of the Electrochemical Society, vol. 90 (1946), pages 331 to 340.